US011559938B2

(12) United States Patent
Boehm et al.

(10) Patent No.: US 11,559,938 B2
(45) Date of Patent: Jan. 24, 2023

(54) METHOD OF LAYERWISE BUILDING UP AN OBJECT AND A 3D PRINTING DEVICE FOR PERFORMING SUCH A METHOD

(71) Applicant: 3M INNOVATIVE PROPERTIES COMPANY, St. Paul, MN (US)

(72) Inventors: Andreas J. Boehm, Reichling (DE); Malte Korten, Moorenweis (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/250,382

(22) PCT Filed: Jul. 17, 2019

(86) PCT No.: PCT/IB2019/056131
§ 371 (c)(1),
(2) Date: Jan. 14, 2021

(87) PCT Pub. No.: WO2020/016815
PCT Pub. Date: Jan. 23, 2020

(65) Prior Publication Data
US 2021/0276248 A1   Sep. 9, 2021

(30) Foreign Application Priority Data

Jul. 20, 2018   (EP) .................................... 18184626

(51) Int. Cl.
*B29C 64/124*   (2017.01)
*B33Y 10/00*   (2015.01)
(Continued)

(52) U.S. Cl.
CPC ........ *B29C 64/124* (2017.08); *A61C 13/0019* (2013.01); *B29C 64/245* (2017.08);
(Continued)

(58) Field of Classification Search
CPC ... B29C 64/124; B29C 64/129; B29C 64/135; B29C 64/35; B29C 64/357
See application file for complete search history.

(56) References Cited

U.S. PATENT DOCUMENTS 5,447,822 A * 9/1995 Hull ...................... B29C 64/135
430/269
7,556,490 B2   7/2009 Wicker
(Continued)

FOREIGN PATENT DOCUMENTS

CN   204977474 U   1/2016
CN   106363906   2/2017
(Continued)

OTHER PUBLICATIONS

1507 Extended EP Search Report for EP18184626.2, dated Feb. 4, 2019, 2pgs.
(Continued)

*Primary Examiner* — Joseph S Del Sole
*Assistant Examiner* — Jamel M Nelson

(57) ABSTRACT

A method of layerwise building up an object from at least a first and a second light hardenable resin on a 3D printing device, and a 3D printing device that is configured to perform such a method. The 3D printing device has a build platform on which the object can be built up, a light-transmissive carrier comprising a plurality of recesses and a light projector for projecting a light-pattern through the carrier. The method has the steps of (a) partially building up the object and thereby providing an object-in-process; (b) coating a first surface area of the carrier with a first blank layer of the first light hardenable resin; (c) moving the carrier and thereby positioning the first blank layer between the build platform and the light projector; (d) bringing the object-in-process into contact with the first blank layer; (e) irradiating the first blank layer with a light pattern and
(Continued)

thereby supplementing the object-in-process by a hardened layer; and (f) separating the supplemented object-in-process from the carrier.

6 Claims, 3 Drawing Sheets

(51) Int. Cl.
*B33Y 30/00* (2015.01)
*B29C 64/264* (2017.01)
*B29C 64/245* (2017.01)
*A61C 13/00* (2006.01)
*B33Y 80/00* (2015.01)
*B29L 31/00* (2006.01)

(52) U.S. Cl.
CPC ............ *B29C 64/264* (2017.08); *B33Y 10/00* (2014.12); *B33Y 30/00* (2014.12); *B29L 2031/7532* (2013.01); *B33Y 80/00* (2014.12)

(56) References Cited

U.S. PATENT DOCUMENTS

| | | |
|---|---|---|
| 10,099,421 B2 | 10/2018 | Facci |
| 11,130,286 B2 | 9/2021 | Arai |
| 2002/0145213 A1 | 10/2002 | Liu |
| 2008/0169586 A1 | 7/2008 | Hull |
| 2008/0206383 A1 | 8/2008 | Hull |
| 2012/0195994 A1 | 8/2012 | El-Siblani |
| 2013/0241113 A1* | 9/2013 | Geers ............... B33Y 30/00 264/401 |
| 2014/0265032 A1* | 9/2014 | Teicher .............. B33Y 10/00 264/401 |

FOREIGN PATENT DOCUMENTS

| | | |
|---|---|---|
| CN | 104527070 | 2/2018 |
| DE | 10-2007-010624 | 9/2008 |
| EP | 2629961 | 8/2013 |
| EP | 3388221 | 10/2018 |
| JP | 2002-331592 | 11/2002 |
| KR | 2001-0100569 | 11/2001 |
| WO | WO 2000-030834 | 6/2000 |
| WO | WO 2001-040866 | 6/2001 |
| WO | WO 2012-053895 | 4/2012 |
| WO | WO 2014-078537 | 5/2014 |
| WO | WO 2016-084367 | 6/2016 |
| WO | WO 2016-170682 | 10/2016 |

OTHER PUBLICATIONS

International Search Report for PCT International Application No. PCT/IB2019/056131, dated Oct. 9, 2019, 5 pages.

\* cited by examiner

METHOD OF LAYERWISE BUILDING UP AN OBJECT AND A 3D PRINTING DEVICE FOR PERFORMING SUCH A METHOD

CROSS REFERENCE TO RELATED APPLICATIONS

This application is a national stage filing under 35 U.S.C. 371 of PCT/IB2019/056131, filed Jul. 17, 2019, which claims the benefit of European Application No. 18184626.2, filed Jul. 20, 2018, the disclosure of which is incorporated by reference in its/their entirety herein.

FIELD OF THE INVENTION

The invention relates to a method of layerwise building up an object from a first and optionally a second light hardenable resin on a 3D printing device. The invention further relates to a 3D printing device that is configured to perform such a method. In particular the invention relates to a method in which layers of one or more non-hardened light hardenable resins are coated on a carrier in the form of blank layers which subsequently are positioned between a build platform and a light projector for hardening portions thereof.

BACKGROUND ART

In a variety of technical fields physical objects or mechanical workpieces are more and more manufactured by additive manufacturing processes.

Such additive manufacturing processes typically allow for building up an object in its desired individual shape by successively adding material to create that shape. Although additive manufacturing processes are widely used in the industry for rapid prototyping, the manufacturing of final products in many areas is still challenging. In particular for making dental restorations it is generally required to use materials that are compatible for use in a human body. Further, a dental restoration manufactured by additive manufacturing must exhibit the required mechanical stability and must fulfil expectations about aesthetics, for example concerning color shading and translucency.

Some additive manufacturing processes are based on hardening light hardenable resins in layers. The light hardenable resins are typically photo-polymerizable and harden locally in consequence of the exposure of light. A desired three-dimensional object can be built up by consecutively adding layers of a shape that is controlled according to the desired outer shape of the object. The object that is to be built up is typically prepared by computer aided design (CAD) and provided in the form of a three-dimensional computer model. The computer model of the object is virtually sliced into individual layers each of which having a particular shape that results from the outer shape of the object. The shape of the layers is determined by exposing such layers to a light pattern that corresponds to the shape of the respective slices.

In many cases the manufacturing focuses on providing the object at a desired shape. Although there are also applications in which objects are provided at a desired color, there is still a need for a method and device which allow the making of objects having multiple colors or a color gradation. In particular there is still a need to provide dental restorations by additive manufacturing at a color gradation that resembles that of natural teeth.

WO 2012/053895 A1 (DSM) describes an additive fabrication apparatus comprising a movable foil guiding stage having a contact face and comprising on opposite sides of the contact face a pair of upper and lower foil guiding elements, the lower foil guiding element defining a foil height position distanced from the contact face, for guiding a foil including a liquid layer to or from the contact face to contact a tangible object by movement of the foil guiding stage along the tangible object while keeping the foil stationary relative to the object. An energy source is arranged for at least partially solidifying at least part of an intersection pattern in the liquid layer arranged on the foil and in contact with the tangible object.

US 2008/0206383 A1 (Hull et al.) relates to a solid imaging apparatus and methods for use that reduce the amount of uncured solid imaging build material remaining on a completed build object following the completion of the solid imaging build process. The amount of uncured build material is reduced through the use of either an uncoating web that removes excess build material from the build object during the course of the building process or an ink jet source of build material that uses only as much build material as is necessary for the fabrication of the build part.

SUMMARY OF THE INVENTION

The invention relates to a method of layerwise building up an object from at least a first light hardenable resin on a 3D printing device. In particular the invention may relate to a method of layerwise building up an object from a first and a second light hardenable resin, and optionally from further light hardenable resins, on a 3D printing device. The first, second and/or further light hardenable resin may be commonly referred to as "light hardenable resins" herein.

The 3D printing device comprises a build platform on which the object can be built up, a light-transmissive carrier and a light projector that is arranged for projecting a light-pattern through the carrier toward the build platform. The carrier comprises a plurality of recesses for receiving the light hardenable resin.

The method comprises the steps of:
(a) partially building up the object and thereby providing an object-in-process;
(b) coating a first surface area of the carrier with a (preferably contiguous) first blank layer (comprised) of the first light hardenable resin;
(c) positioning the first blank layer between the build platform and the light projector;
(d) advancing the build platform toward the carrier and thereby bringing the object-in-process into contact with the first blank layer;
(e) irradiating the first blank layer with a light pattern to cause portions that are irradiated by the pattern to harden and thereby supplementing the object-in-process by a hardened layer; and
(f) retracting the build platform from the carrier and thereby separating the supplemented object-in-process from the carrier.

The term "portions" in step (e) covers one portion. Accordingly term "portions" means "one or more portions".

The invention is advantageous in that it allows the making of an object from layers of different resins. In particular the invention allows the making of an object that has a color and/or translucency gradation. The invention is further advantageous in that it helps maximizing the throughput of a 3D printing device by decoupling of the preparation of layers and hardening of layers used to build up the object.

The presence of recesses for receiving the light hardenable resin simplifies the coating process. It may also reduce the risk of a possible cross-contamination if two light hardenable resins are used. Using a recess may further help to reduce the waste of not-used light hardenable resin as only the portion of the carrier with the recess is filled with the light hardenable resin.

The step (c) may be defined by moving the carrier and thereby positioning the first blank layer between the build platform and the light projector.

The 3D printing device preferably has a coating station and an additive manufacturing station. The coating station and the additive manufacturing station are preferably spaced from each other along process flow direction. The process flow direction is a direction along which the carrier moves. Step (b) is preferably performed in the coating station and steps (d) and (e) are preferably performed in the additive manufacturing station. Thus, the coating can be performed independently from the additive manufacturing. For example, steps (b) and (e) may be performed at the same time or overlapping with each other. Therefore, the object can be built up at minimized time.

In one embodiment the method further comprises the steps of:
(g) coating a second surface area of the carrier with a (preferably contiguous) second blank layer (comprised) of the second light hardenable resin;
(h) positioning the second blank layer between the build platform and the light projector;
(i) advancing the build platform toward the carrier and thereby bringing the object-in-process into contact with the second blank layer;
(j) irradiating the second blank layer with a light pattern to cause portions that are irradiated by the pattern to harden and thereby supplementing the object-in-process by a further hardened layer; and
(k) retracting the build platform from the carrier and thereby separating the supplemented object-in-process from the carrier.

The term "portions" in step (j) covers also one portion. Accordingly term "portions" means "one or more portions".

Preferably the build axis can be advanced and retracted along a build axis. The build axis is further that axis along which the object is successively built up.

The step (h) may be defined by moving the carrier and thereby positioning the second blank layer between the build platform and the light projector.

The step (g) is preferably performed in the coating station and steps (i) and (j) are preferably performed in the additive manufacturing station.

Generally, the method of the invention may be performed using more than the first and second light hardenable resin. The first, second and any further light hardenable resin is preferably a photopolymerizable resin comprising a photoinitiator. The hardening is preferably performed by irradiation of the light hardenable resin by light. The light hardenable resin may particularly comprise acyl phosphine oxide as a photoinitiator. Further the light hardenable resin may be based on monomers with (meth)acrylate moieties as reactive groups. The light resin may contains fillers, dyes and colorants.

The wavelength of light that is appropriate to harden the light hardenable resin may be within a range of 450 nm to 495 nm (blue light) or 330 nm to 450 nm, preferably 383 nm (UV-light). The light used for the method of the invention can be selected in accordance to the light hardenable resin used.

Further, the first surface area and the second surface area may be spaced from each other. In particular the first surface area and the second surface area may be spaced from each other in a dimension of the process flow direction.

Accordingly, the method may further comprise the steps of:
(l) coating a third or further surface area of the carrier with a (preferably contiguous) third or further blank layer (comprised) of a third or further light hardenable resin;
(m) positioning the third or further blank layer between the build platform and the light projector;
(n) advancing the build platform toward the carrier and thereby bringing the object-in-process into contact with the third or further blank layer;
(o) irradiating the third or further blank layer with a light pattern to cause portions that are irradiated by the pattern to harden and thereby supplementing the object-in-process by a further hardened layer; and
(p) retracting the build platform from the carrier and thereby separating the supplemented object-in-process from the carrier.

The term "portions" in step (o) covers also one portion. Accordingly term "portions" means "one or more portions".

The step (m) may be defined by moving the carrier and thereby positioning the third or further blank layer between the build platform and the light projector.

In steps (d), (i) and (n) the build platform is preferably advanced from a position in which the object-in-process is not in contact with the first, second, third or further blank layer, respectively, to a position in which the object-in-process is in contact with the with the first, second, third or further blank layer, respectively. The position in which the object-in-process is in contact with the first, second, third or further blank layer preferably corresponds to a proximal position, whereas the position in which the object-in-process is not in contact with the first, second, third or further blank layer preferably corresponds to a retracted position.

In the proximal position the object-in-process may not be in direct contact with the carrier. The step (f), (k) and (p) preferably results in the object-in-process to be positioned in the retracted position. Accordingly, in step (f), (k) and (p) the object-in-process is preferably positioned from the proximal position to the retracted position.

Preferably the first surface area and the second surface area (and eventually the third or further surface area) are offset from each other. In particular the first surface area and the second surface area (and eventually the third or further surface area) may be offset from each other in a dimension of the process flow direction.

In an embodiment the steps (b) and (g) are performed timely overlapping or simultaneously.

Further, the steps (b) and (g) may be performed prior to any of the steps (e) or (o).

In an embodiment the steps (c)-(f) are performed prior to steps (h)-(k).

Preferably in steps (d), (i) and (n) the object-in-process is positioned relative to the carrier so that a distance between the object-in-process and the carrier is provided. In an embodiment the first blank layer and the second blank layer each have a thickness that corresponds (or essentially corresponds) to the distance. The first blank layer and the second blank layer further may each have a thickness that is [up to 105%] of the distance. Such an oversize of the first and second blank layer may be provided for achieving an air or bubble free contact between each of the first and second blank layer and the object-in-process.

In an optional embodiment the object-in-process is supplemented by two or more hardened layers which are arranged side by side on a plane that is perpendicular to the build axis. The two or more hardened layers may be obtained from different light hardenable resins as follows. The light hardenable resins may for example differ from each other in color and/or translucency at least at a stage when they are hardened. In a first course a first hardened layer may be supplemented to the object-in-process in accordance to the method steps (b) to (f). In a second course a second hardened layer may be supplemented to the object-in-process in accordance to the method steps (g) to (k). In the second course, however, the object-in-process is advanced in step (i) toward the carrier such that the first hardened layer is in contact with the carrier. In step (j) the second blank layer is hardened at a portion or portions that is/are outside the first hardened layer.

In a further optional embodiment the 3D printing device comprises at least a first multiple-resin dispenser, for example based on ink-jet. In this optional embodiment two or more different light hardenable resins can be dispensed for coating the first surface area with a first blank layer that is comprised of different light hardenable resins. Thus, the 3D printing device is configured for building up an object that has a color and/or translucency gradation not only along the build axis but also in the two dimensions perpendicular to the build axis. Such an optional embodiment may further comprise a second multiple-resin dispenser and optionally further multiple-resin dispensers for coating the second surface area (or a further surface area) with a second blank layer that is comprised of different light hardenable resins. Again the light hardenable resins may for example differ from each other in color and/or translucency at least at a stage when they are hardened.

In an embodiment the carrier is flat and the first and second blank layer project from the carrier. In particular the first and second blank layer project from the carrier in a dimension transverse to the process flow direction. The light hardenable resins are preferably flowable but self-supporting. This means that the light hardenable resins do not significantly change in shape within a time period of 60 seconds. In particular the light hardenable resins are composed so that the first, second and/or further blank layer do not change in thickness by more than [5%] within a time period of 60 seconds.

In a further embodiment the carrier comprises a plurality of recesses for receiving the first, second and/or any further light hardenable resin. The recesses may be sized to accommodate the entire first, second and/or further blank layer. Therefore the first, second and/or further blank layer may not stick out from the respective recesses, and preferably are flush with a surface of the carrier that surrounds the recesses.

In a further embodiment the method may comprise the step of embossing the carrier and thereby creating the plurality of recesses.

In a further embodiment the step (b) may comprise filling of one of the plurality of recesses with some of the first light hardenable resin to form the first blank layer. The step (g) may comprise filling of another one of the plurality of recesses with some of the second light hardenable resin to form the second blank layer.

In an embodiment the method further comprises the step of providing the carrier from an infeed reel. Further, the method may comprise the step of discharging the carrier onto a discharge reel. The discharged carrier may carry at least a portion of the first light hardenable resin (or any of the second or further light hardenable resin). Accordingly the method of the invention may comprise a reel to reel process in which the first, second and optionally further light hardenable resin are coated on the carrier and subsequently used to build up the object.

A residual portion of the first blank layer may be formed as a result of separating the supplemented object-in-process from the carrier. In particular the residual portion is that portion of the first blank layer that remains on the carrier, after the object-in-process was supplemented by use of the first blank layer. Accordingly a residual portion of the second or further blank layer may be formed as a result of separating the supplemented object-in-process from the carrier. Such residual portions are portions of the first, second or further blank layer that remain on the carrier after the object-in-process was supplemented by use of the first, second or further blank layer. Thus any processing of residual light hardenable resin is facilitated after hardening.

In a further embodiment the method comprises the step of irradiating the residual portion of the first blank layer with light to cause that residual portion to harden. The method may further comprise the step of irradiating the residual portion of the second or further blank layer with light to cause these residual portions to harden. Accordingly the 3D printing device may have a cleaning station in which any residual portion of the first, second or further layer is removed from the carrier or prepared for removal from the carrier.

In a further embodiment the method comprises the step of disposing the hardened residual portion of the first blank layer. The step of disposing the hardened residual portion of the first blank layer may comprise separating the hardened residual portion from the carrier, for example by bending the carrier. The carrier may for example be bent by guiding the carrier over a roll that causes the carrier to deflect.

In an embodiment the method further comprises the step of moving the carrier and thereby positioning the residual portion of the first blank layer outside the additive manufacturing station (or outside an area between the build platform and the light projector). The method may further comprise the step of moving the carrier and thereby positioning the residual portion of the second or further blank layer outside the additive manufacturing station (or outside an area between the build platform and the light projector).

In a further aspect the invention relates to a 3D printing device for layerwise building up an object from at least a first and optionally a second light hardenable resin. The 3D printing device is preferably configured for performing the method of the invention and optionally for performing any of the optional method features as disclosed herein.

In an embodiment the object is a dental restoration or dental restoration part. The first, second and any further light hardenable resin may (at least after hardening) exhibit colors that resemble natural tooth colors.

The 3D printing device in particular comprises a build platform on which the object can be built up, a light-transmissive carrier and a light projector that is arranged for projecting a light-pattern in a direction along a build axis through the carrier toward the build platform. The build axis is preferably arranged transverse to the process flow direction. The build platform is movable along the build axis, and the carrier is movable laterally to the build axis (or along the process flow direction). The 3D printing device may further have a light-transmissive (preferably transparent) exposure plate. The light projector is preferably arranged for projecting the light-pattern in a direction along a build axis through the exposure plate toward the build platform. The carrier is preferably guided such that it is supported on the exposure plate. The build platform, the light projector and the exposure plate may form components of an additive manufacturing station that is based on stereolithography such as Digital Light Processing™ (DLP).

The 3D printing device further comprises a first dispenser for coating a first surface area of the carrier with a first blank layer of the first light hardenable resin. Further, the 3D printing device may comprise a second dispenser for coating a second surface area of the carrier with a second blank layer of the second light hardenable resin. The 3D printing device may comprise one or more further dispensers for coating one or more further surface areas of the carrier with one or more further blank layers of the one or more further light hardenable resin. Thus, the 3D printing device is configured for building up an object from different light hardenable resins, and thus may be configured for building up an object from different colors. The first, second and further dispensers may be arranged within or form a coating station of the 3D printing device.

Each of the first, second or further dispenser may comprise an ink-jet or roll coater. Further the first, second or further dispenser may comprise a tank that is formed by a circumferential wall (for example a hollow-cylindrical wall). The tank may comprise the first, second or any further light hardenable resin. The tank preferably has a circumferential seal for sealingly abutting the carrier. Thus, a bottom side of the tank (being the side oriented toward the center of gravity) may be closed by the carrier. The seal is preferably configured so that it can sealingly slide on the carrier. For example the seal may be formed by an elastic sealing lip. Therefore, the carrier is enabled to be moved under the tank while the tank seals on the carrier. The first (second or further) light hardenable resin is wiped off from the carrier in an area outside the recess by the seal as the carrier is moved. However, any light hardenable resin present within the recess remains within the carrier (in particular within the recess). A support structure may be provided to support or urge the carrier against the seal.

In an embodiment the 3D printing device is configured for moving the build platform and the carrier to positions that are determined by computer control. In particular the 3D printing device is preferably configured for moving the build platform to different positions along the build axis relative to the carrier and/or relative to the exposure plate by computer control.

Further the 3D printing device may be configured for moving the carrier to different positions by computer control. In particular the 3D printing device is preferably configured for moving the carrier to different positions laterally of the build axis relative to the build platform and the exposure plate by computer control. In other words, the 3D printing device is preferably configured for moving the carrier in the process flow direction relative to the additive manufacturing station by computer control.

It is noted that although it may be of advantage to move the build platform along the build axis it is regarded to be equivalent to alternatively or additionally move the carrier and/or the exposure plate along the build axis. Likewise instead of moving the carrier in the process flow direction it may be possible to move the additive manufacturing station in or against the process flow direction. Therefore a 3D printing device in which a distance between the build platform and the carrier is adjusted by movement of any other component than the build platform is regarded as equivalent. And further a 3D printing device in which the carrier stands still and the additive manufacturing station is moved is also regarded as equivalent.

In an embodiment the light that forms the light-pattern comprises or is formed of a wavelength that is suitable to cause the first light hardenable resin to harden. The wavelength may be particularly within a range of 330 nm to 450 nm. A preferred wavelength is 383 nm.

In an embodiment the 3D printing device comprises an infeed reel for providing the carrier. The 3D printing device may further have and a discharge reel for discharging the carrier.

In an embodiment the carrier is formed by an endless belt.

In a further embodiment the 3D printing device comprises two or more carriers arranged in parallel. Preferably the carriers are movable parallel to each other. Further the 3D printing device may have one carrier forming two or more tracks in a dimension transverse of the process flow direction. This enables the arrangement of blank layers not only in the process flow direction but also laterally thereto.

The 3D printing device may have additive manufacturing station that is movable laterally to the process flow direction. Thus the object-in-process can be supplemented by adding hardened layers from different tracks or carriers.

In an embodiment the 3D printing device is based on stereolithography such as Digital Light Processing™ (DLP).

In one embodiment the 3D printing device has a printer cartridge in which the carrier and the coating station are accommodated. Preferably the printer cartridge is removably fixed at the additive manufacturing station. Thus the printer cartridge can be exchanged or replaced in the additive manufacturing station by another printer cartridge. In particular the printer cartridge may comprise at least the first dispenser. Further the printer cartridge may comprise the second and optionally further dispensers. The printer cartridge preferably comprises a chassis that holds the first, second and/or further dispensers and the carrier in a predetermined positional relationship to each other. Further the chassis may comprise an infeed reel from which the carrier can be obtained and a discharge reel for discharging the carrier after use for build up the object. The printer cartridge can be replaced in case all of the carrier is removed from the infeed reel and/or in case any of the first, second and/or further dispenser is out of light hardenable resin. Any removed printer cartridge may be recycled by refilling the first, second and further dispenser, as needed, and by exchanging the used carrier by a fresh carrier. Optionally the printer cartridge may comprise the carrier in the form of a closed belt. In this optional embodiment the printer cartridge (or the additive manufacturing station) may comprise the cleaning station for removing any residual light hardenable resin from the carrier. The recycling of such a printer cartridge may comprise the exchange of the carrier only in cases in which the carrier is worn or according to a maintenance cycle. Further the recycling may comprise refilling of the first, second and further dispenser, as needed.

The printing cartridge may have a first interface that is configured for being mated with a corresponding second interface of the additive manufacturing station. For example several printing cartridges may have a standardized first interface for mating with the second interface of the additive manufacturing station.

DETAILED DESCRIPTION OF THE INVENTION

Figure 1:
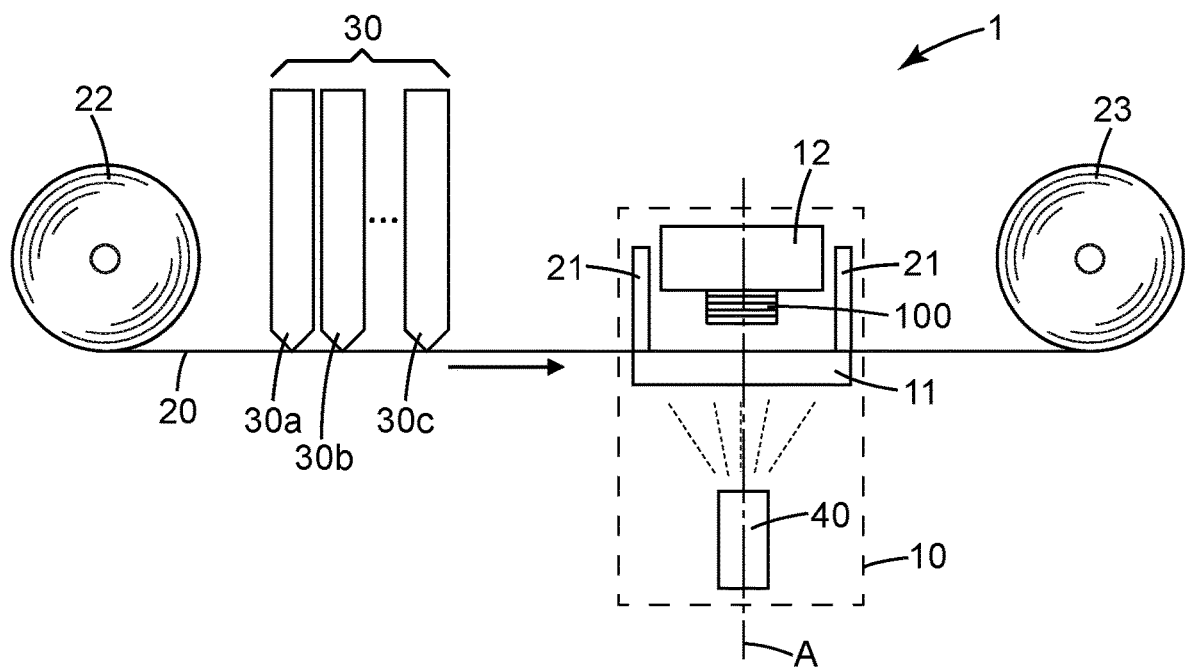
FIG. 1 is a side view illustrating a 3D printing device described in the present text.

FIG. 1 illustrates a 3D printing device 1 for building up an object by additive manufacturing. Shown is an object-in-process 100 (an object that is partially but not yet completely built up). The 3D printing device 1 is configured for performing the method described in the present text. The device 1 shown comprises an additive manufacturing station 10 that is based on the so-called Digital Light Processing (DLP) technique. This technique uses a back-illuminable light-transmissive (preferably transparent) exposure plate 11 and a build platform 12 between which the object can be built up. The invention is not limited to DLP, but may be likewise used with other additive manufacturing processes or devices based on light hardenable resins, as appropriate. In particular other stereolithography processes or devices may be used with the present invention.

The build platform 12 is movable relative to the exposure plate 11 along a build axis A. The build platform 12 retains or holds the object or object-in-process 100 during building up. The 3D printing device 1 is equipped with a light-transmissive (preferably transparent) carrier 20. The carrier 20 is movable through a gap that can be left between the exposure plate 11 and the build platform 12. The carrier 20 is movable laterally to the build axis A and is preferably arranged directly on the exposure plate 11. The 3D printing device 1 has clamping bars 21 that are provided to hold the carrier 20 down on the exposure plate 11. The clamping bars 21 are movable. Thus the clamping bars 21 can be retracted from the exposure plate 11 for allowing the carrier 20 to be moved. Alternatively the clamping bars 21 can be moved toward the exposure plate 11 to hold the carrier 20 down on the exposure plate 11.

The 3D printing device 1 shown is configured for building up the object in layers from a light hardened resin. Each layer is generated in that a light hardenable resin is hardened in a predetermined gap provided between the carrier 20 and the build platform 12. The gap is provided by positioning the build platform 12 accordingly. A light projector 40 projects a (two-dimensional) light pattern through the exposure plate 11 and the carrier 20 toward the build platform 12 and thus causes those portions of the light hardenable resin to harden that are exposed to the light pattern (while portions outside the light pattern remain non-hardened). The hardened resin forms a layer that then is pulled away from the carrier by the build platform 12 so that a new gap is formed between that layer and the carrier 20. The so formed new gap is used for creating a new layer and so on.

The light projector 40 in the example is a digital light projector so that the light pattern emitted from the light projector 40 can be controlled by a computer. Typically the light pattern is determined by computer control based on a three-dimensional representation or model of the object to be built. The three-dimensional representation can for example be generated on a CAD system, for example a dental CAD system that allows designing dental restorations or dental restorations parts. Typically the three-dimensional representation is cut into virtual slices of uniform thickness having a two-dimensional outline that corresponds to an outer shape of the three-dimensional representation where it is cut.

The light projector 40 is configured for projecting light at a corresponding two-dimensional pattern. The light pattern may be based on a matrix of a multiplicity of pixels arranged in a regular pattern, for example like a checkerboard. The light projector 40 is configured such that each pixel of the pattern can be illuminated or left dark. The resolution of the light pattern adjacent the carrier 20 determines the accuracy at which the object can be built up in dimensions perpendicular to the build axis A. The control of the light pattern may be provided by a so-called Digital Micro-mirror Device (DMD). The DMD comprises a multiplicity of individually rotatable small mirrors which can be oriented for deflecting light from a light beam toward the exposure plate to generate a light pixel or away from the exposure plate to generate a dark pixel. The skilled person will recognize other techniques for light projection. For example, the light projector may be based on the LCD (Liquid Crystal Display) projection technique. The light pattern may be further based on a movable light beam, for example a laser beam. In this technique the pattern may or may not be based on a matrix of pixels.

The light used for the light projection comprises light in a wavelength range that is required or suitable for hardening the light hardenable resin, in the example UV-light within a wavelength range of about 330 nm to about 450 nm, and in particular 383 nm.

The 3D printing device 1 has a plurality of dispensers 30 of which, by way of example, a first, second and third dispenser 30a, 30b and 30c are illustrated. Although only three dispensers 30 are illustrated and described in the following, further dispensers may be provided having the same features as disclosed for the three dispensers shown.

In particular, the first, second and third dispenser 30a, 30b, 30c preferably are configured for dispensing a first, second and third light-hardenable resin, respectively. The first, second and third light-hardenable resin can differ from each other, for example by color and/or translucency at least at a stage after which they are hardened. Each of the first, second and third dispenser 30a, 30b, 30c may be based on a printing or coating technique, for example ink-jet, roll coating, screen printing or gravure printing.

Figure 2:
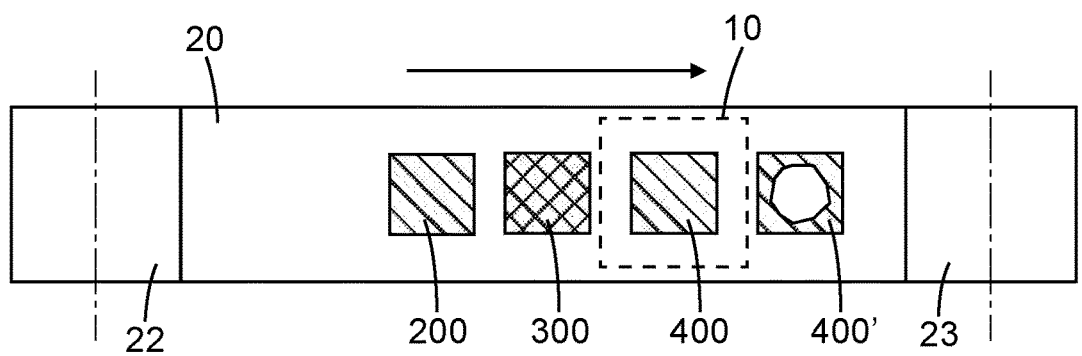
FIG. 2 is a top view of the device shown in FIG. 1.

According to FIG. 2 by way of example a first, second and third light hardenable resin 200, 300, 400 are dispensed by the first, second and third dispenser 30a, 30b, 30c respectively. The first, second and third light hardenable resin 200, 300, 400 are dispensed on the carrier 20 at an area outside the additive manufacturing station 10 and are subsequently positioned into the additive manufacturing station 10. Although not shown, it is possible to selectively dispense any of the first, second and third light hardenable resin 200, 300, 400 (or one or more further light hardenable resins) individually or in any order, as desired. For example instead of dispensing the first, second and third light hardenable resin 200, 300, 400 in a consecutive order, only one of the first, second and third light hardenable resin 200, 300, 400 may be dispensed. Further, any of the first, second and third light hardenable resin 200, 300, 400 may be dispensed multiple times consecutively before another one of the first, second and third light hardenable resin 200, 300, 400 is dispensed individually or multiple times consecutively. The so dispensed light hardenable resins (selected from the first, second and third light hardenable resin 200, 300, 400, and optionally from one or more further light hardenable resins in any order) are subsequently moved between the build platform 12 (shown in FIG. 1) and the exposure plate 11 (shown in FIG. 1) for hardening and thus supplementing the object-in-process 100 by additional hardened layers.

The dispensed light hardenable resins are consecutively moved between the build platform 12 and the exposure plate 11 by means of the carrier 20 where they are used for building up the object. For the movement of the carrier 20 with the dispensed light hardenable resins disposed thereon the build platform 12 is positioned at a retracted position away from the carrier 20 to allow the hardenable resins to be moved into the additive manufacturing station 10 without colliding with the build platform 12. For example, for the movement of the carrier 20 with the second light hardenable resin 300 disposed thereon into the additive manufacturing station 10, the build platform 12 is positioned at a distance from exposure plate 11 that is greater than the thickness of the second light hardenable resin 300 and the carrier in combination. Once the second light hardenable resin 300 is positioned between the build platform 12 and the exposure plate 11 the build platform 12 is positioned further toward the exposure plate 11. In particular once the second light hardenable resin 300 is positioned between the build platform 12 and the exposure plate 11 the build platform 12 is positioned at a predetermined distance from the exposure plate 11 at which the object-in-process 100 is in contact with the second light hardenable resin 300. At that position the object-in-process 100 is not in contact with the carrier 20 so that the second light hardenable resin 300 fills a gap between the carrier 20 and object-in-process 100.

Then the light projector 40 (see FIG. 1) is used to harden at least a portion of the second light hardenable resin 300 to form a hardened layer that supplements the object-in-process 100. The build platform 12 is subsequently retracted to the retracted position and the same steps are repeated for the first light hardenable resin 200.

Some of the light hardenable resin may reside on the carrier 20 after any portion of light hardenable resin was hardened, as illustrated by way of example for the third light hardenable resin 400'. Any residing light hardenable resin can be disposed together with the carrier 20 after use for building up the object.

As shown the (different and/or same) light hardenable resins are dispensed at a predetermined uniform pitch relative to each other. The carrier 20 may position each dispensed light hardenable resin into the additive manufacturing station 10 in accordance to that pitch.

With the 3D printing device 1 and with the method described it is possible to build up the object by providing (or "stacking") a multiplicity of layers in sequence. The 3D printing device and the method of the invention is particularly suitable to generate any desired order of hardened layers of the same and/or different properties. For example if the light hardenable resins are composed to exhibit different colors (at least when hardened) an object can be built up that has a certain color gradation in a dimension along the build axis A.

The layers typically have the same or a pre-determined uniform thickness (i.e. along the build axis A) but can be individually two-dimensionally shaped in dimensions laterally to the thickness based on different light patterns. It is however possible to build up an object by providing a multiplicity of layers having different thicknesses. Therefore three-dimensional objects of a great variety of different shapes and color gradations can be built up with the 3D printing device and the method of the invention.

The 3D printing device 1 has an infeed reel 22 from which the carrier can be supplied. Further the 3D printing device 1 has a discharge reel 23 for gathering the carrier 20 (eventually with hardenable resin residing thereon) after use for building up several objects. The carrier 20 may be disposable. For example, the discharge reel 23 may be disposed after use for building up several objects.

Figure 3:
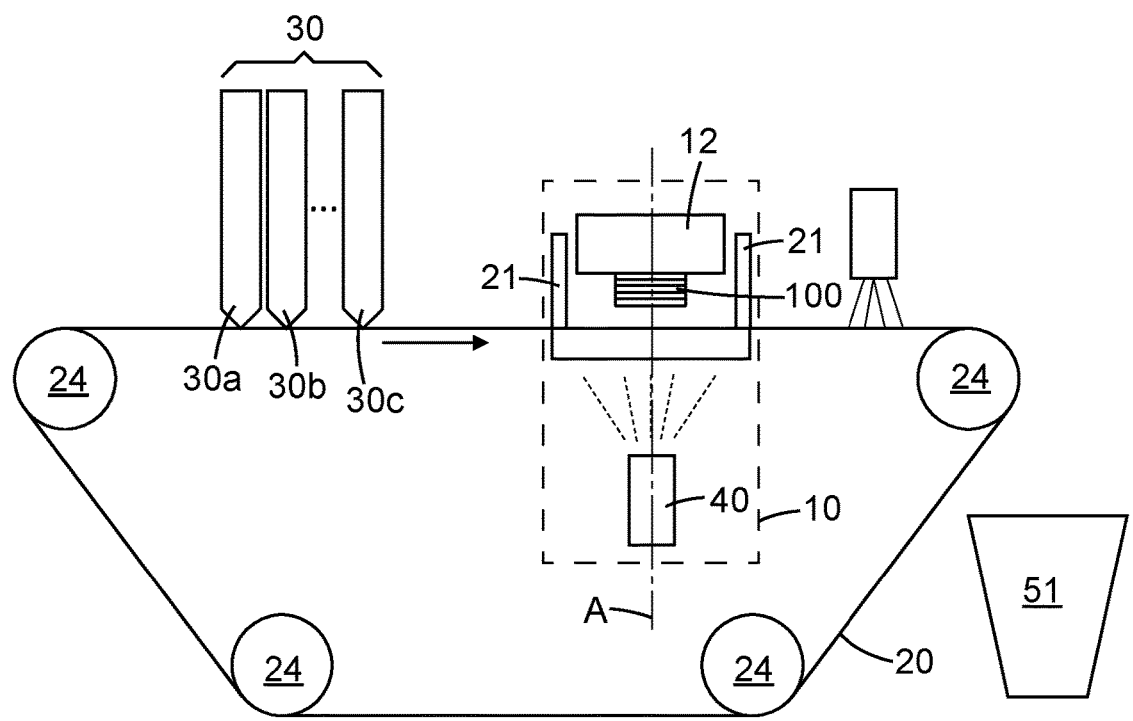
FIG. 3 is a side view illustrating a further 3D printing device described in the present text.

FIG. 3 shows a 3D printing device 1 which corresponds to the 3D printing device shown in FIG. 1 except that the carrier in this example is formed by an endless belt. Further, the 3D printing device 1 has a cleaning station 50.

The 3D printing device 1 is configured for building up an object by additive manufacturing, and particularly is configured for performing the method of the invention. Again shown is an object-in-process 100. The 3D printing device 1 shown comprises an additive manufacturing station 10 that is based on Digital Light Processing (DLP) as described above.

The build platform 12 is movable relative to the exposure plate 11 along a build axis A. The build platform 12 retains or holds the object or object-in-process 100 during building up. The 3D printing device 1 has a light-transmissive (preferably transparent) carrier 20 which is this example is formed as endless belt. Deflector rolls 24 help guiding the carrier 20 during movement.

The carrier 20 can be moved laterally to the build axis A and is preferably arranged directly on the exposure plate 11. The 3D printing device 1 has movable clamping bars 21 that are provided to hold the carrier 20 down on the exposure plate 11.

A light projector 40 is arranged for projecting a (two-dimensional) light pattern through the exposure plate 11 and the carrier 20 toward the build platform 12. The light projector 40 in the example is a digital light projector so that the light pattern emitted from the light projector 40 can be controlled by a computer. The light used for the light projection comprises light in a wavelength range that is required or suitable for hardening the light hardenable resin, in the example UV-light within a wavelength range of about 330 nm to about 450 nm, and in particular 383 nm.

The 3D printing device 1 further has a plurality of dispensers 30. In particular a first, second and third dispenser 30a, 30b and 30c are illustrated by way of example. The first, second and third dispenser 30a, 30b, 30c preferably are configured for dispensing a first, second and third light-hardenable resin, respectively, as described in FIG. 1.

The cleaning station 50 in the example is formed by a light source that can emit light that is suitable to cause the light hardenable resins to harden. In particular the light source is configured to emitting UV-light within a wavelength range of about 330 nm to about 450 nm, and in particular 383 nm. The cleaning station 50 thus causes any residual light hardenable resin on the carrier to harden. As the carrier is moved over the deflector roll the hardened (and thus stiff) residual resin separates from the carrier 20. The hardened residual resin may be gathered in a container 51 and disposed after. Therefore the carrier 20 can be used for continuously coating a blank layer thereon, supplementing the object-in-process by a hardened layer obtained from the blank layer and removing any residual light hardenable resin from the carrier.

Figure 4:
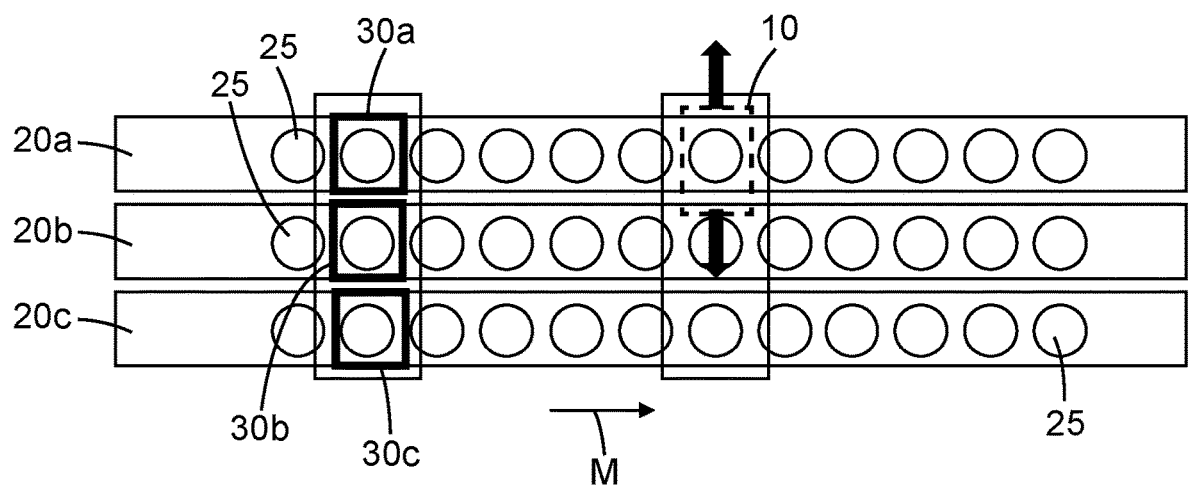
FIG. 4 is a top view illustrating a further 3D printing device described in the present text.

FIG. 4 shows a 3D printing device 1 which may correspond to the examples of FIG. 1 or 2 but which has, instead of only one carrier, multiple carriers 20a, 20b, 20c. In the example a first, second and third carrier 20a, 20b and 20c are arranged side by side. The first, second and third carrier 20a, 20b and 20c can be moved parallel to each other in a direction laterally of the build axis (process flow direction indicated by the arrow designated as "M"). In the example a first, second and third dispenser 30a, 30b and 30c are arranged along a dimension transverse to the process flow direction M. Accordingly each of the first, second and third carrier 20a, 20b, 20c may be coated with the first, second and third light hardenable resin, respectively. In particular, a first surface area of the first carrier 20a may be coated with a first blank layer of the first light hardenable resin, a second surface area of the second carrier 20b may be coated with a second blank layer of the second light hardenable resin and a third surface area of the third carrier 20c may be coated with a third blank layer of the third light hardenable resin. An additive manufacturing station 10 (as described in the context of FIGS. 1, 2 and 3) is movably arranged for a movement in a dimension transverse to the process flow direction M. Thus the additive manufacturing station 10 can be selectively positioned to the first, second or third blank layer for supplementing the object-in-process by a hardened layer obtained from any of the first, second or third blank layer. It is noted that instead of multiples carriers, one common carrier forming multiple tracks may be likewise used.

Figure 5:
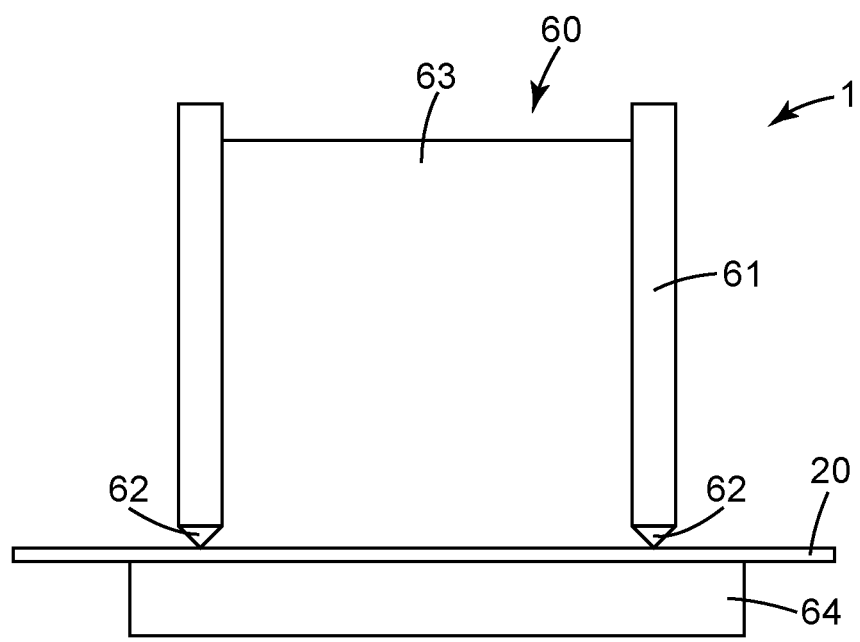
FIG. 5 is a partial side view illustrating a portion of yet another 3D printing device described in the present text.

In the example the first, second and third carrier has a plurality of recesses 25 for holding the light hardenable resin as described in FIG. 5.

FIG. 5 shows a portion the 3D printing device 1 with a carrier 20 as it may be used with the embodiments shown in any of the FIGS. 1 to 4. The carrier 20 has plurality of recesses 25 (one of which is illustrated in this view). The recesses 25 are provided for receiving light hardenable resin therein. The recesses 25 may be particularly used for receiving low viscosity light hardenable resins that otherwise would distribute on the carrier in an uncontrolled manner. The 3D printing device 1 may have an embossing station (not shown) for embossing the carrier 20 and thereby to provide the recesses 25.

The 3D printing device 1 has a tank 60 which in the example is formed by a circumferential wall 61 (for example a hollow-cylindrical wall). The first light hardenable resin 63 (or another light hardenable resin) is provided in the tank 60. The tank 60 further has a circumferential seal 62 which sealingly abuts the carrier 20. The seal 62 is configured so that it can sealingly slide on the carrier 20. Accordingly the carrier 20 can be moved under the tank 60 while the tank 60 seals on the carrier 20. The first light hardenable resin 63 is wiped off from the carrier 20 in an area outside the recess 25 by the seal 62 as the carrier 20 is moved. However, any light hardenable resin present within the recess 25 is levelled flush with the surface of the carrier 20 that abuts with the seal 62. Thus the recesses 25 of the carrier 20 can be entirely filled by the first light hardenable resin. The carrier 20 can be subsequently moved to position the recess 25 filled with the light hardenable resin between the build platform and the light projector of the additive manufacturing station. A support structure 64 may be provided to support the carrier 20 against the seal 62.

What is claimed is:

1. A method of layerwise building up an object from at least a first and a second light hardenable resin on a 3D printing device, the 3D printing device comprising a build platform on which the object can be built up, a light-transmissive carrier comprising a plurality of recesses and a light projector that is arranged for projecting a light-pattern through the carrier toward the build platform, the method comprising the steps of:
   (a) partially building up the object and thereby providing an object-in-process;
   (b) filling one of the plurality of recesses of the carrier with a first blank layer of the first light hardenable resin such that the first blank layer is flush with a surface of the carrier that surrounds the recess;
   (c) positioning the first blank layer between the build platform and the light projector;
   (d) advancing the build platform toward the carrier and thereby bringing the object-in-process into contact with the first blank layer;
   (e) irradiating the first blank layer with a light pattern to cause portions that are irradiated by the pattern to harden and thereby supplementing the object-in-process by a hardened layer;
   (f) retracting the build platform from the carrier and thereby separating the supplemented object-in-process from the carrier;
   (g) filling a second of the plurality of recesses of the carrier with a second blank layer of the second light hardenable resin such that the second blank layer is flush with a surface of the carrier that surrounds the recess;
   (h) positioning the second blank layer between the build platform and the light projector;
   (i) advancing the build platform toward the carrier and thereby bringing the object-in-process into contact with the second blank layer;
   (j) irradiating the second blank layer with a light pattern to cause portions that are irradiated by the pattern to harden and thereby supplementing the object-in-process by a further hardened layer; and
   (k) retracting the build platform from the carrier and thereby separating the supplemented object-in-process from the carrier.

2. The method of claim 1, wherein the steps (b) and (g) are performed timely overlapping.

3. The method of claim 2, wherein the steps (c)-(f) are performed prior to steps (h)-(k).

4. The method of claim 1, wherein in steps (d) and (i) the object-in-process is positioned relative to the carrier so that a distance between the object-in-process and the carrier is provided, wherein the first and second blank layer each have a thickness that corresponds to the distance.

5. The method of claim 1 further comprising the steps of providing the carrier from an infeed reel and discharging the carrier onto a discharge reel.

6. The method of claim 1, wherein a residual portion of the first blank layer is formed as a result of separating the supplemented object-in-process from the carrier, wherein the method further comprises the steps of irradiating the residual portion of the first blank layer with light to cause that residual portion to harden; and disposing the hardened residual portion of the first blank layer.

* * * * *